United States Patent [19]

Braswell et al.

[11] 4,083,656

[45] Apr. 11, 1978

[54] COMPOSITE ROTOR BLADE

[75] Inventors: James L. Braswell; Cecil E. Covington, both of Hurst; Nolan B. Phillips, Fort Worth; Reggie J. Tomerlin, Cleburne; Robert M. Wohlfeld, Dallas, all of Tex.

[73] Assignee: Textron, Inc., Providence, R.I.

[21] Appl. No.: 560,587

[22] Filed: Mar. 21, 1975

[51] Int. Cl.² ............................................. B64C 27/32
[52] U.S. Cl. ....................................... 416/226; 416/230; 416/241 A
[58] Field of Search ................ 416/226, 230, 241 A, 416/229, 233, 232

[56] References Cited

U.S. PATENT DOCUMENTS

| | | | |
|---|---|---|---|
| 2,588,570 | 3/1952 | Pitcairn | 416/230 X |
| 2,954,828 | 10/1960 | Marchetti | 416/226 |
| 3,028,292 | 4/1962 | Hinds | 416/226 X |
| 3,176,775 | 4/1965 | Clemens | 416/226 X |
| 3,237,697 | 3/1966 | Ford et al. | 416/226 |
| 3,321,019 | 5/1967 | Dmitroff et al. | 416/230 X |
| 3,476,625 | 11/1969 | Slivinsky et al. | 416/226 X |
| 3,477,796 | 11/1969 | Weiland | 416/230 |
| 3,484,174 | 12/1969 | McCoubrey | 416/226 X |
| 3,528,753 | 9/1970 | Dutton et al. | 416/226 |
| 3,533,714 | 10/1970 | Pfleiderer | 416/230 A X |
| 3,713,753 | 1/1973 | Brunsch | 416/226 |
| 3,754,840 | 8/1973 | Zincone | 416/226 |
| 3,779,487 | 12/1973 | Ashton et al. | 416/230 A X |
| 3,782,856 | 1/1974 | Salkind et al. | 416/226 |
| 3,813,186 | 5/1974 | Palachek | 416/226 |
| 3,950,115 | 4/1976 | Euler | 416/226 |
| 3,962,506 | 6/1976 | Dunahoo | 416/230 X |
| 3,967,996 | 7/1976 | Kamov et al. | 416/226 |

FOREIGN PATENT DOCUMENTS

| | | | |
|---|---|---|---|
| 1,334,446 | 7/1963 | France | 416/230 |
| 1,506,573 | 9/1969 | Germany | 416/230 |
| 1,531,369 | 1/1970 | Germany | 416/230 |
| 909,617 | 10/1962 | United Kingdom | 416/233 |

*Primary Examiner*—Everette A. Powell, Jr.
*Attorney, Agent, or Firm*—Richards, Harris & Medlock

[57] ABSTRACT

A composite rotor blade has a nose spar of fiber reinforced plastic with the fibers extending spanwise the length of the spar and at the root encircling a transverse hub attachment structure with the spar provided with a tubular inner liner of cross ply filament wound fiberglass forming a closure for the nose spar with a blad afterbody structure including skins for integrating the afterbody with the nose spar and liner. Preferably the spar has an inner liner and an outer liner both of cross ply filament wound fiberglass in multi layers. The blade afterbody structure includes honeycomb filler having cells extending in the direction of blade thickness.

14 Claims, 13 Drawing Figures

COMPOSITE ROTOR BLADE

This invention relates to a composite rotor blade for helicopters and the like. A substantially completely nonmetallic structure comprises a fiber reinforced plastic nose spar extending spanwise bounded inside and outside by cross ply fibers for reinforcement and with a cross ply fiber skin trailing the nose spar and supported by a cellular core structure.

Manufacture and use of rotor blades for aircraft is highly advanced. There remains heretofore unachieved goals relative to extending the fatigue life of a blade, increasing the survivability of such blade in combat environments, minimizing the maintainability characteristics and reducing the radar signature of the rotor system. Single rotor helicopter blades having cord lengths of 3 to 4 feet and spans of 25 feet or more are employed. In such structures, it is desirable to minimize weight while providing the requisite mechanical characteristics necessary to satisfy the demands characteristic of helicopter operation.

Prior U.S. Pat. Nos. 3,799,700; 3,813,186 and 3,829,240 illustrate rotor blades constructed for different ultimate objectives. In general, they involve a nose or leading edge spar which spans the rotor blade. The trailing edge of the spar in each case is closed by a channel structure. Upper and lower trailing skins are secured at the leading edges thereof to the nose spar and generally are supported by cellular bodies formed as columns extending in the direction of the airfoil thickness. The skins terminate in a trailing tip structure to complete a unitary body light in weight. Heretofore, nose spars generally have been metallic channels associated with metallic or nonmetallic laminant skins and fillers.

A rotor blade produced in accordance with U.S. Pat. Nos. 3,237,697; 3,476,484; 3,533,714 and German Pat. No. 1,531,369 utilizes glass fibers in a glass fiber reinforced plastic nose spar connected to trailing skins which terminate at the trailing edge of the blade. In those systems, the whole blade is employed for incorporating torsional stiffness. Such blades, however, do not satisfy the needs for blades involved in large helicopter applications.

The present invention is related to an all composite blade characterized by a spanwise oriented unidirectional glass reinforced spar with the fibers wrapped around a main retention structure with shear continuity provided by a filament wound 45° glass tube inside spar and a similar overwrap to form a closed spar of integral construction from which upper and lower trailing skins extend to a trailing edge and behind which airfoil thickness directed cellular core structures are provided to support the trailing skins.

In a more specific sense, a nose spar is formed of fiber reinforced plastic with the fibers extending spanwise the length of the spar and at the root encircling a transverse hub attachment structure. Tubular liner means of cross ply fiber reinforced plastic extends from the region of the retention structure to the region of the tip of the blade to form a closure for the nose spar. A blade afterbody has means including a skin for integrating the afterbody with the nose spar and liner.

In a further aspect, an outer cross ply fiber reinforced plastic tube encompasses the nose spar and the liner.

In a further aspect, a second spar extends spanwise midway of the nose spar and the trailing edge of the airfoil.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 11:
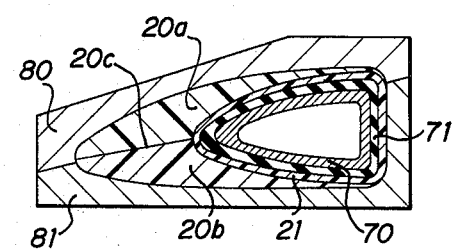
Figure 12:
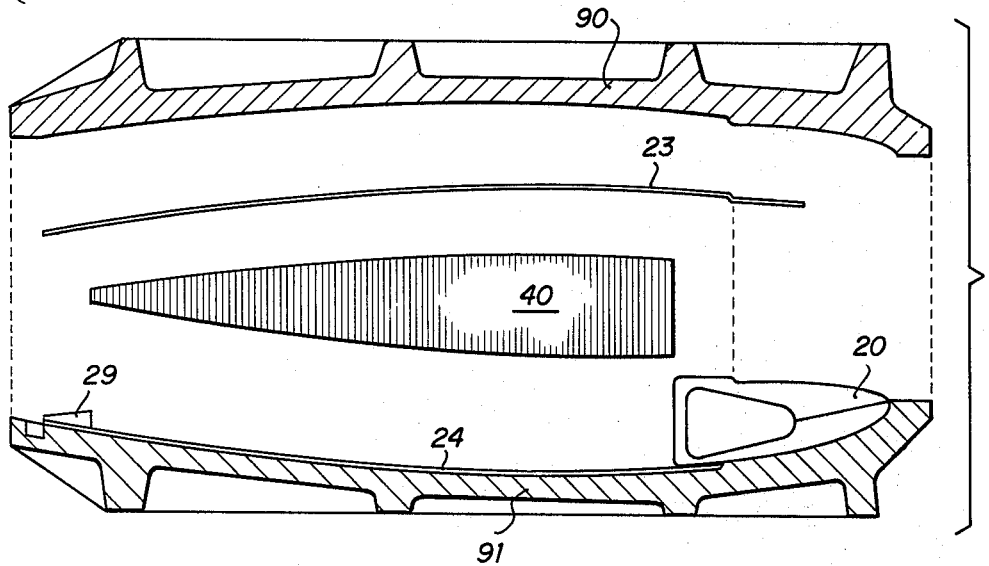

FIG. 11 illustrates the assembly of the inner liner 21 with the spar halves 20a and 20b;

FIG. 12 illustrates the assembly of a blade in a suitable mold; and

Figure 13:
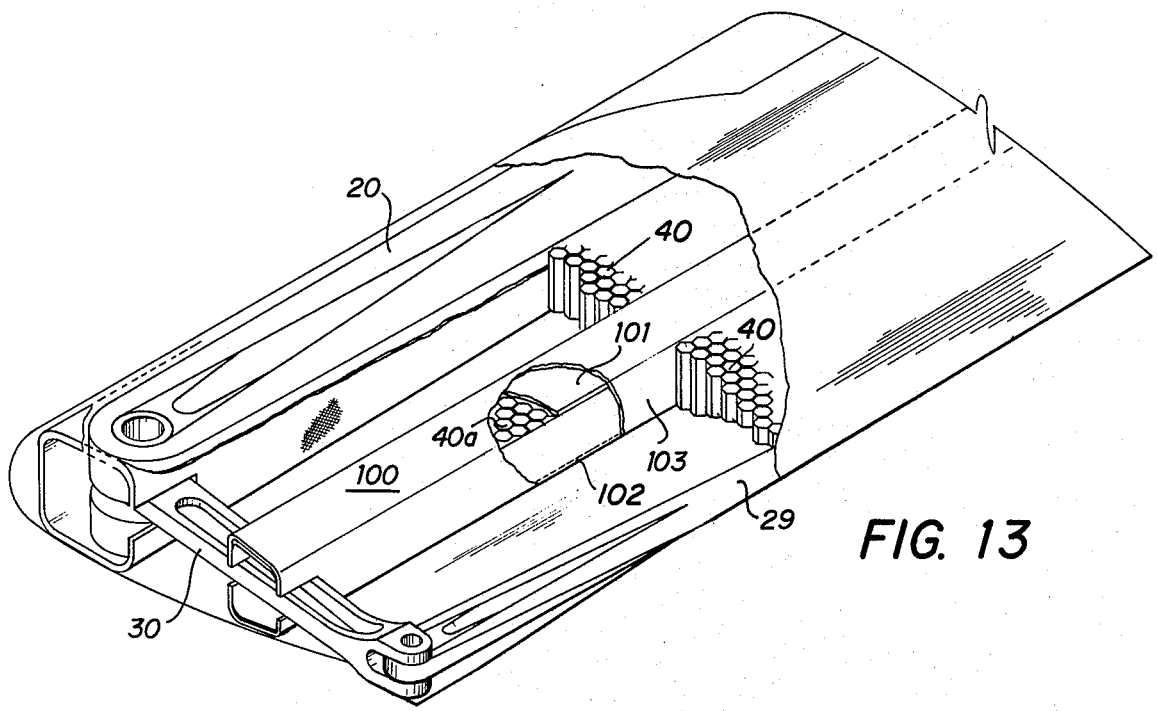

FIG. 13 illustrates a modification of the invention employing an intermediate spar.

Figure 1:
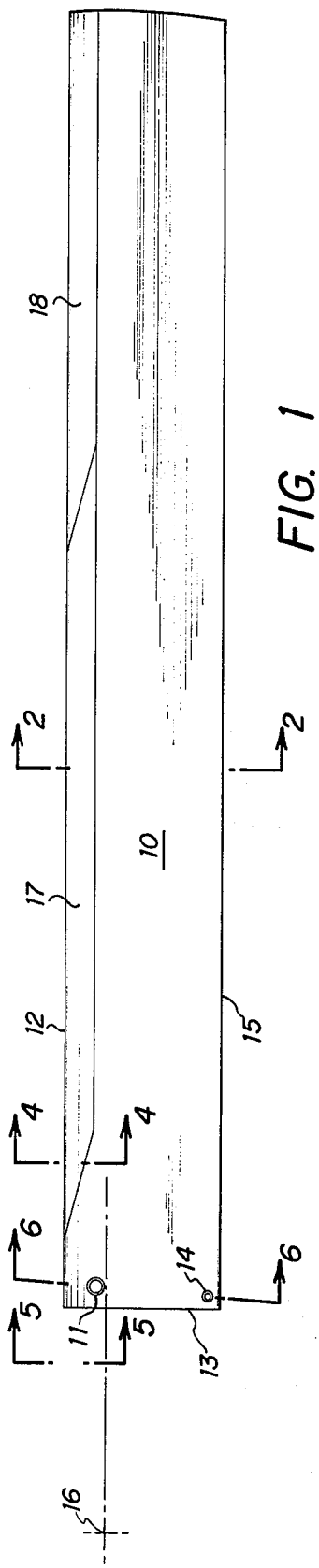
FIG. 1 is a plan view of a rotor blade embodying the present invention.

Referring now to FIG. 1, a plan view of one embodiment of the present invention illustrates a blade 10. A main anchor sleeve 11 is positioned adjacent to the nose 12 of blade 10 and adjacent to the root end 13. A second anchor sleeve 14 near the trailing edge 15 is provided so that the blade can be mounted on a grip system for rotation about a rotor whose axis is at point 16. The root portion of the nose 12 is provided with an abrasion resistant plastic erosion strip 17. The outboard portion of the nose 12 is provided with a stainless steel erosion strip 18.

In the present invention, except for erosion strip 18 and anchor sleeves 11 and 14, blade 10 is a composite of non-metallic elements.

Figure 2:
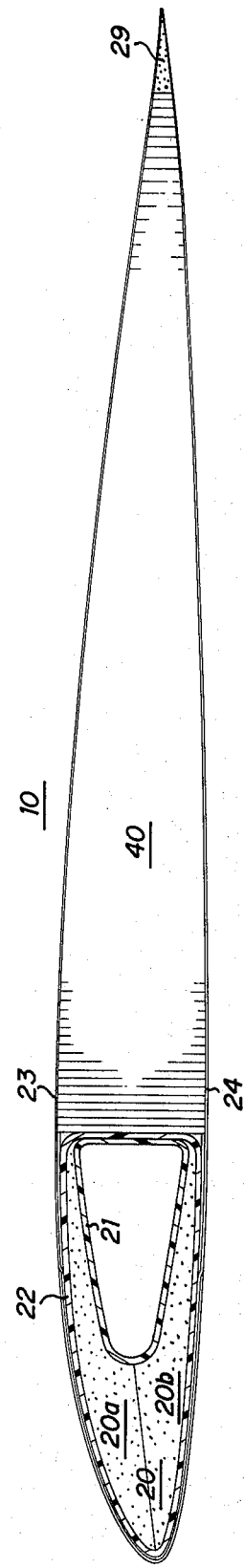
FIG. 2 is a sectional view of the blade of FIG. 1 taken on lines 2—2 of FIG. 1.
Figure 3:
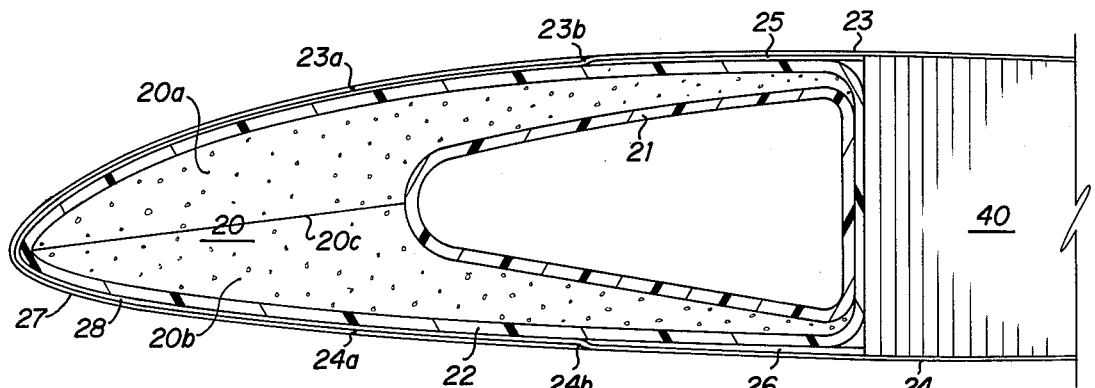
FIG. 3 is an enlarged view of the nose spar of FIG. 2.

FIG. 2 illustrates the blade in a typical section taken at a point spaced from the root. FIG. 3 is an enlarged view of the nose spar of FIG. 2. Blade 10 is formed with a nose spar 20. Nose spar 20 is formed from two parts integrated to form a unitary nose spar 20. Nose spar 20 is made of fiber reinforced plastic with the fibers extending spanwise the length of span 20. At the root of span 20, the fibers encircle a transverse anchor sleeve as will hereinafter be described. Span 20 is made of an upper half 20a and a lower half 20b which after being initially formed are joined together along the median line 20c. When joined, spar 20 is open at the trailing edges thereof.

Spar 20 is integrated with a torque box liner 21 in the form of a formed tube of cross ply fiber reinforced plastic. Liner 21 extends from a point slightly outboard of the anchor sleeve to the region of the tip of the blade and forms a rear closure for spar 20.

Preferably, spar 20 is further provided with an outer cross ply fiber reinforced plastic tube 22 which encompasses the spar 20 and liner 21 so that there is provided an elongated hollow integral spar tube closed at the rear by liners 21 and 22 with the leading edge comprising primarily the structure forming spar 20.

Blade 10 further comprises an upper skin 23 and a lower skin 24. Skins 23 and 24 preferably are made of a plurality of layers of fabric in which unidirectional fibers are successively laid up with the fibers in the successive layer at known preselected orientations. Some of the layers have fibers running spanwise. Other layers have fibers running at 45° to the span length. Other layers have fibers running at 30° to the span length.

Upper skin 23 terminates at its leading edge 23a at a point forward of the midpoint of spar 20. Lower skin 24 correspondingly terminates at point 24a. A strip 25 between the upper skin 23 and a strip 26 under the lower skin 24 of the surface of the skins 23 and 24 causes the skin surface to be stepped at points 23b and 24b. An erosion strip 27 extends over span 20 and a nose skin layer 28 with the trailing edges of strip 27 terminating at the steps 23b and 24b.

Skins 23 and 24 are secured at the trailing edges to a trailing edge spar 29. The trailing edge spar 29 is made of fiber reinforced plastic with the fibers extending spanwise the length of the spar. Between the rear of the tube 22 and the front of the trailing edge spar 29, the skins 23 and 24 are spaced apart by a cellular spacer material 40 contoured to form a smooth airfoil of desired shape between the nose spar 20 and the trailing edge spar 29.

Figure 4:
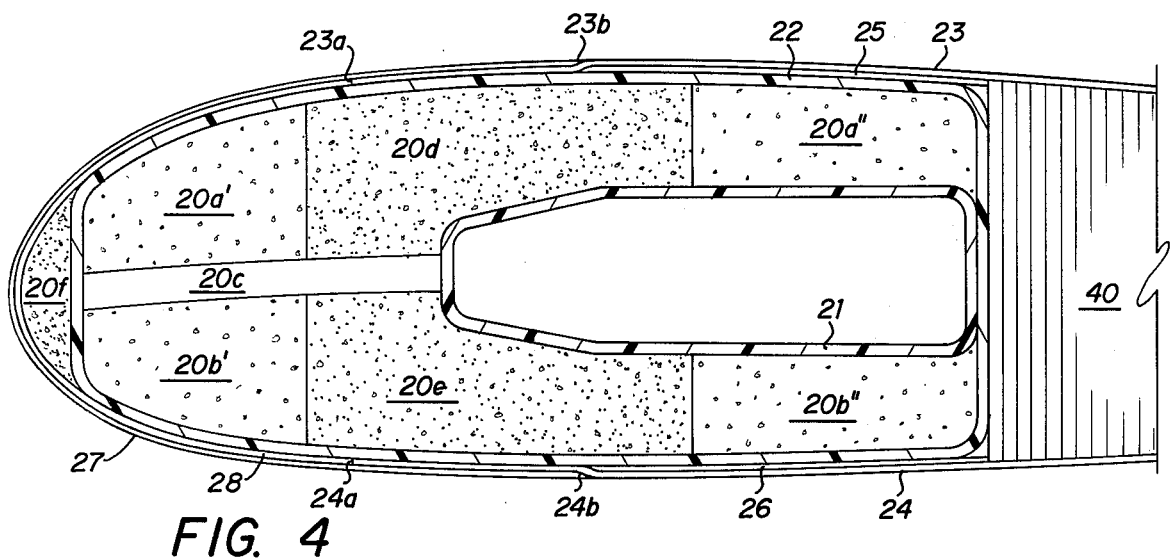
FIG. 4 is an enlarged view of the nose spar taken along lines 4—4 of FIG. 1.
Figure 5:
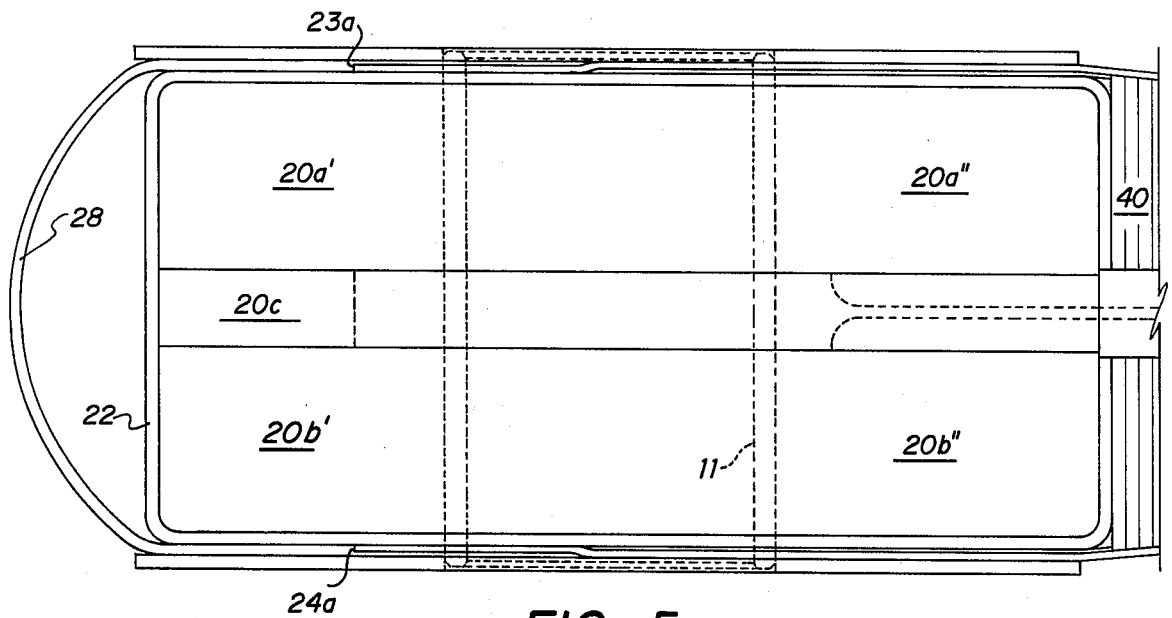
FIG. 5 is an enlarged view of the nose spar taken along lines 5—5 of FIG. 1.

FIGS. 4 and 5 illustrate the transition in the configuration of nose spar 20 from the typical section shown in FIGS. 2 and 3 to the section at the location of the attachment sleeve 11 at the end root of the blade. In FIGS. 4 and 5, where appropriate, the same reference characters are employed as in FIGS. 2 and 3.

A transition configuration is employed in order for the fibers forming the nose spar 20 to divide and encircle attachment sleeve 11 in the root end of the blade. Thus, the fibers forming the upper half 20a of FIG. 3 are divided into two parts 20a' and 20a". The lower half 20b is divided into two parts 20b' and 20b". Inner liner 21 is of a shape substantially modified from the shape shown in FIG. 3, the transition being gradual so that the liner 21 is more rectangular in FIG. 4 than the triangular shape of FIG. 3. The outer liner 22 also has assumed a more rectangular shape.

A divider strip 20c separates the halves 20a' and 20b'. A formed body 20d and 20e serve as supports for the transition section. A body 20f fills the space between the leading surface of the liner 22 and the nose skins 27 and 28.

Figure 6:
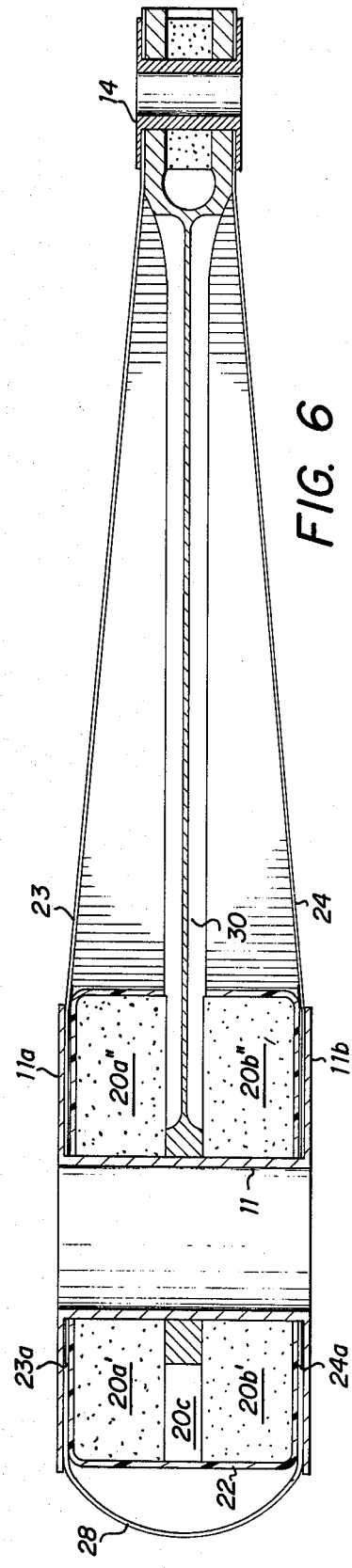
FIG. 6 is a sectional view of the blade taken along lines 5—5 of FIG. 1.

In FIGS. 5 and 6 the outer liner 22 is substantially rectangular at the root and is pierced transversely by the main bolt attachment sleeve 11 which is integral with an upper fretting plate 11a and a lower fretting plate 11b. Skins 23 and 24 extend over the attachment sleeve 11 and are pierced thereby. The plate 20c is substantially thicker than in FIG. 4 and is integral with a kick strut 30 extending from attachment sleeve 11 to the trailing edge attachment sleeve 14. The fibers forming the spar are equally divided and are shaped rectangularly as the four sections 20a', 20a", 20b' and 20b". The fibers of section 20a' are continuous with the fibers of section 20a" and encircle the attachment sleeve 11a at the root. Similarly, the fibers of section 20b' are continuous with the fibers of section 20b" and encircle the lower portion of the attachment sleeve 11 at the root.

Preferably the material employed for forming the nose spar 20 is known as S-glass. Such fibers are manufactured by Owens-Corning of Corning, N.Y., and identified as S/2 glass fibers. Further, typical of the fibers employed are those manufactured by the Ferro Corporation of Culver City, Calif., and identified as S/1014 Fibers formed in rovings where each roving has a 20 end count per roving with 220 fibers per end with the fibers 0.00035 inch in diameter and providing about 750 yards of roving per pound of glass. Such fibers are wetted with a suitable resin so that as they are laid into a desired shape and the resin is permitted or caused to cure the glass fibers are united by the resin in an integral body such as shown in FIG. 3. A suitable resin is of the type manufactured and sold by the Furane Company of Glendale, Calif., under the trademark EPOCAST and identified as Catalog No. 1835/9231 Hardener System. This material is an epoxy resin which is compatible with the S-glass fibers above identified.

The filler 40 of FIG. 3 preferably is made of phenolic impregnated nylon paper. Such paper is manufactured and sold by E. I. DuPont de Nemours & Company of Wilmington, Del. under the trademark NOMEX. Such paper is formed into a cellular structure suitable for the support of the skins 23 and 24. Such structure preferably is of the type manufactured and sold by the Hexcel Corporation of Graham, Tex. and identified as 3 pound density Nomex honeycomb filler. Such honeycomb filler has hexagonal cells whose axes extend in the direction of the blade thickness so that columnar support is provided by the cellular structure for the skins 23 and 24.

Figure 7:
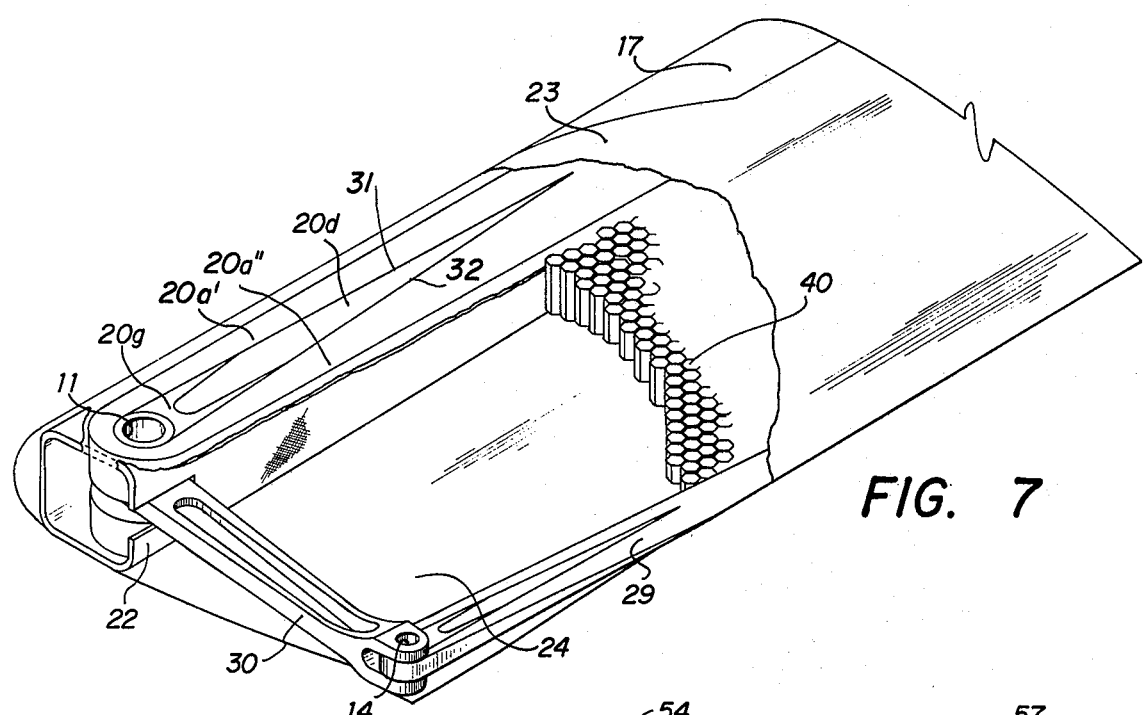
FIG. 7 is an isometric view of the root end of the wing partially broken away to show the relative orientation of the parts.

FIG. 7 is an isometric view partially broken away to illustrate the structure of the blade described above in detail and illustrated in FIGS. 1–6. The nose spar 20 is shown with the glass fiber bodies 21a' and 21a" encircling the attachment sleeve 11. The spar overwrap liner 22 extends to the root of the blade and thus to a point inboard of the attachment sleeve 11. Filler block 20d is tapered with the outboard end thereof nesting a molded plastic filler block 20g. The inboard end of filler block 20g bears against the sleeve 11 and is adhesively secured to the inner surfaces of the parts 20a' and 20a".

The transition in the shape of the body formed by the span oriented fibers is illustrated by lines 31 and 32 defining the leading edge and the trailing edge of the filler blocks 20d and 20g. The filler block in plan view is generally wedge shaped bearing at the root end thereof against the surface of the attachment sleeve 11. There is a smooth transition in the fiber body from the section shown in FIG. 5 at the root end to the section shown in FIG. 3.

The kick strut 30 encircles sleeve 11 and extends to a sleeve 14 which is secured to the inboard end of the trailing edge strut 29. The kick strut 30 is positioned in a slot in the outer liner 22. Honeycomb core 40 is shown in position to support the skin 23. With skin 23 broken away, the inner surface of the skin 24 can be seen.

Figure 8:
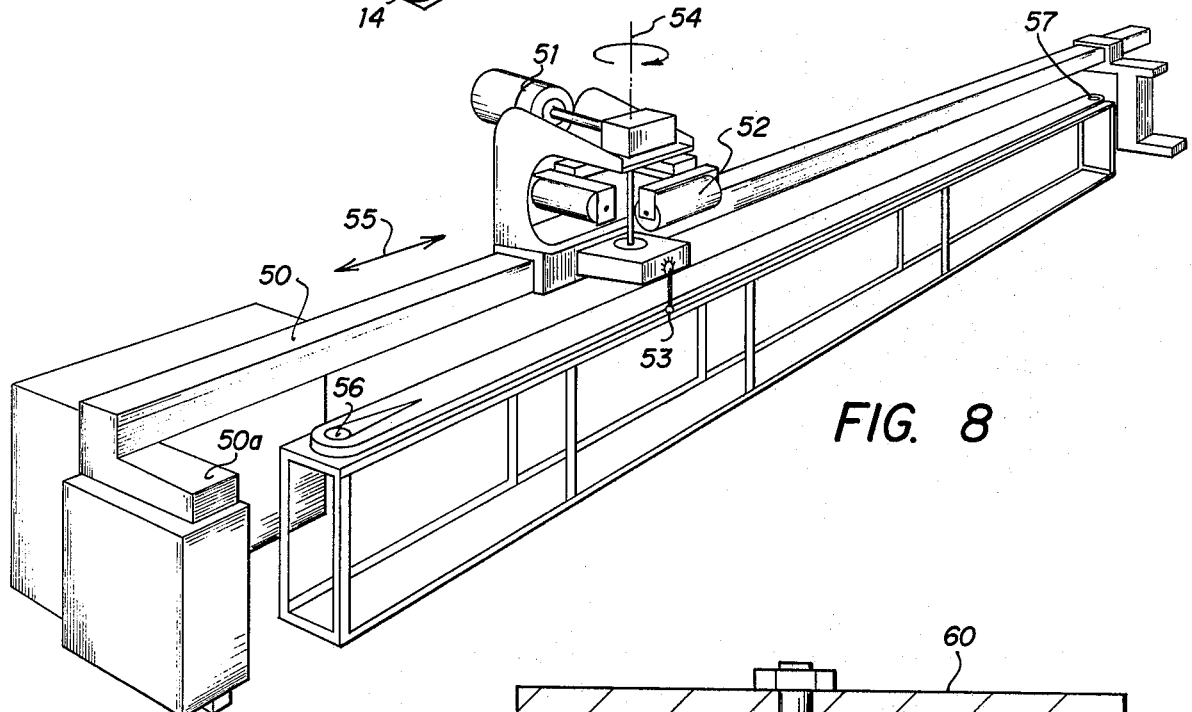
FIG. 8 illustrates a filament winding machine employed for the manufacture of the nose spar elements of FIGS. 2-7.

The nose spar 20 preferably is formed in the manner illustrated in FIG. 8. In this system, a filament winding machine has an elongated bed 50 along which a winding head 51 travels. Filaments from one or more spools 52 mounted on winding head 51 are threaded through a guide 53. Guide 53 is mounted for rotation about an axis 54. Head 51 reciprocates along bed 50 as indicated by arrow 55. The axis 54 travels from one extremity wherein it is aligned with the axis of a pin 56 to the other extremity wherein it is aligned with the axis of a pin 57. When the head 51 stops at the end of the traverse, the support for guide 53 is rotated and then the winding head 51 begins its traverse to the opposite end so that the filaments are wound repeatedly around pins 56 and 57.

Figure 9:
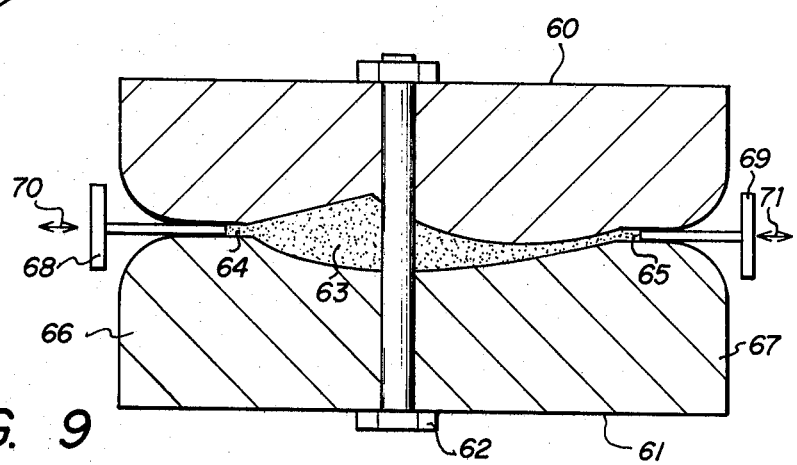
FIG. 9 is a sectional view of molds used to form one spar half.

While in FIG. 8 the filaments are shown merely wound around pins 56 and 57, they preferably will be formed by utilization of an open mold such as shown in FIG. 9, where the mold for the lower spar half 20b of FIG. 3 is shown. An upper mold half 60 and a lower mold half 61 are shown in transverse sectional view. The halves 60,61 extend the distance between and beyond pins 56 and 57 of FIG. 8. Mold halves 60,61 are secured one to another by a series of bolts such as the bolt 62 which extend vertically between mold halves 60 and 61. A cavity 63 is formed within the molds with open throats 64 and 65 leading into the molds from opposite edges 66 and 67. As guide 53 repeatedly circles the mold of FIG. 9, the rovings of fiberglass are successively placed within cavity 63 and are located on opposite sides of bolts 62. The bolts 62 secure the mold halves 60,61 such that the axis 54 follows a path immediately above the axis of the bolt 62 and is unimpeded in its travel.

The winding machine of FIG. 8 is operated until a quantity of glass fiber rovings have been placed within the cavity 63 to fill the same. Thereafter, the upper half mold 60 can then be clamped in place, bolts 62 removed and side bars 68 and 69 moved inwardly in the direction of arrows 70 and 71, respectively. The side bars 68 and 69 extend the full length of the fiber path. The fibers are thus compacted into the space occupied by the bolts 62. Thereafter, with side bars 68 and 69 retracted, the mold halves 60 and 61 can be compressed to complete molding of the lower half of the spar 20.

A second suitably shaped mold is then utilized for the upper half.

Figure 10:
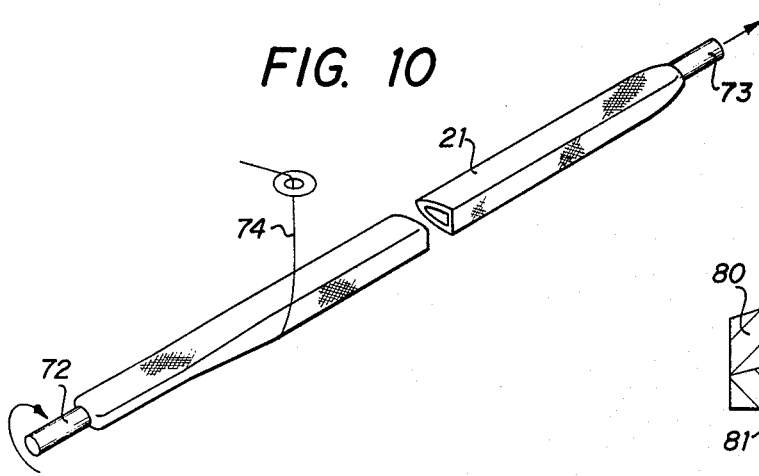
FIG. 10 illustrates the manufacture of the inner liner 21.

Inner liner 21 may be formed in the manner illustrated in FIGS. 10 and 11. As shown in FIG. 11, a metal mandrel 70 is enclosed within an elastomeric pressure bag 71. Mandrel 70 is of length exceeding the span of the blade to be formed. Mandrel 70 is provided with end bosses 72 and 73 shown in FIG. 10. Boss 72 is mounted in a chuck in the portion 50a of the machine of FIG. 8 and boss 73 in a support at the opposite end so that mandrel 70 can be rotated. The pressure bag 71 then has fiber rovings 74 threaded onto the rotating form by the winding head of FIG. 8 as it reciprocates the length of the bed 50. By this means, the fibers are laid onto the exterior of the pressure bag 71 with an angular orientation, preferably of 45° with respect to the axis of the bosses 72 and 73. By this means a relatively thin cross ply fiber reinforced plastic tube is formed on the outside of the pressure bag 71.

When such cross ply fiber tube is completed, it is assembled in the manner shown in FIG. 11. More particularly, the liner 21 on the outside of the pressure bag 71 is placed in a pair of mold halves 80 and 81 along with the two halves 20a and 20b of the fiber reinforced nose spar structure previously described in connection with FIG. 9. Adhesive is provided at the boundary 20c and between the exterior surface of the liner 21 and the interior surfaces of the halves 20a and 20b so that within mold 80, 81, the two halves 20a, 20b of the spar and the liner are integrated as a single unitary body.

This body is then removed from the mold 80, 81 and is again placed in the winding machine of FIG. 8. As in FIG. 10, the bosses 72 and 73 are again used for mounting the unitary body for rotation. An outer layer of cross ply fiberglass reinforcing is applied to the exterior, thereby to form liner 22.

With outer liner 22 applied to the unitary structure, the elastomeric pressure bag 71 may then be deflated. When deflated, the mandrel 70 may be removed. The pressure bag 71 may then be removed.

The blade trailing edge strip 29 is comprised of spanwise oriented filament glass wound around the drag brace bolt sleeve 14, FIG. 7, in the same manner as caps 20a and 20b but in a suitably shaped mold.

Span 20 and trailing edge spar 29 may then be assembled with the remainder of the blade elements in the manner generally indicated in FIG. 12. A lower mold 91 receives the nose spar structure 20 and the lower skin 24. The honeycomb filler 40 is placed against the trailing surface of the spar 20 and on the upper surface of the lower skin 24. The upper skin 23 is then applied with the trailing edge spar 29 in place. The upper mold half 90 is then applied to the stack so that the system may be unified adhesively under pressure and with the necessary adhesives as are well known in the fabrication art so that the blase can be completed.

Preferably the winding process is a wet filament winding process wherein the filaments are wetted as they leave the winding head. Thus, polar winding of the longitudinal spar caps 20a and 20b is efficiently accomplished. The spar caps 20a and 20b, FIG. 11, are unified into a single spar body and serve to carry large axial tension loads which follow the airfoil contour and continue forward and fill the nose area which heretofore has been occupied by an essentially nonstructural nose block. The primary structural elements of the blade are spanwise oriented unidirectional S-glass spar caps 20a and 20b produced by an automatic wet filament winding process. The fibers are wrapped around the main retention bolt sleeve comprising the main bolt attachment hub. Shear continuity is provided between the spar caps 20a and 20b by the filament wound ±45° E glass tube 21 which is inside span 20 and a ±45° E glass overwrap liner 22. The massive nose section of this spar provides high resistance to tree strikes and a good residual strength in the event of ballistic damage.

Fiberglass spar elements are highly desirable because of relatively low cost, relatively low modulus of elasticity and high density which facilitates dynamic tuning of the blade. The C spar construction provides adequate mass balance without the use of nonstructural nose weights. The outer skin is preferably made of a material identified under the trade designation Kevlar 49 cross ply oriented at 45°. Such skin material is manufactured and sold by the DuPont Company of Wilmington, Del. This material has high impact resistance, low density and high shear modulus relative to its modulus in tension. This feature enhances the blade torsional stiffness without excessive flapwise bending stiffness.

In a modification of the invention illustrated in FIG. 13, the blade of FIG. 7 has an additional structure element added to it. The additional element is an aft torque box 100. Box 100 is provided to enhance the survivability of the blade. Box 100 extends spanwise from the kick strut 30 to the tip of the blade. It is located midway along the chord between the nose spar 30 and the trailing edge spar 29. In one form, as shown in the cutaway section of the box 100, box 100 comprises a core of honeycomb material 40a. The length of the honeycomb material 40a is less by a small amount as will appear than the sections of the honeycomb 40 leading and trailing box 100. Overlaying the upper ends of the honeycomb section 40a is a thin wide strap 101 of resin unified spanwise extending glass fiber rovings. Underlaying the bottom of the honeycomb section 40 is a light strap 102. In a typical example where the blade chord is 3 to 4 feet long, the straps 101 and 102 are of thickness of about 0.040 inch and of width of about 4.0 inches. Straps 101 and 102 extend the length of the blade. Straps 101 and 102 and the core section 40a are then provided with shear continuity by a filament wound ±45° E glass tube or skin 103 of the same material as used in the inner liner 21 and the outer liner 22 of FIGS. 1–12. The filament or fibers of one layer thus are oriented about 90° from the filaments of adjacent layers. In the form shown in FIG. 13, the inboard end of the torque box 100 is slotted to accommodate the mid section of the kick strut 30. The primary role of the kick strut 30 is to carry chordwise loads imposed by a drag brace which is used to angularly attach the blade to the grip. The function of the torque box 100 is to provide increased sections of spanwise extending tension bearing supporting members integrated in a torque box having the cross ply skins thereon to provide torsional shear continuity to the structure.

Having described the invention in connection with certain specific embodiments thereof, it is to be understood that further modifications may now suggest themselves to those skilled in the art and it is intended to cover such modifications as fall within the scope of the appended claims.

What is claimed is:

1. A composite rotor blade comprising:
 (a) a nose spar of fiber reinforced plastic with the fibers extending spanwise the length of said span, at the root encircling a transverse hub attachment structure and of channel shape open rearwardly,
 (b) a tubular inner liner of cross ply fiber reinforced plastic extending from a point outboard of said attachment structure to the region of the tip of said blade integrated to form a liner and closure for said spar, and
 (c) a blade afterbody structure having means including a skin for integrating said afterbody with said nose spar and said liner.

2. The combination set forth in claim 1 in which an outer cross ply fiber reinforced plastic tube encompassing said nose spar and said liner and forming a layer between said nose spar and said skin.

3. The combination set forth in claim 2 in which said liner and said tube are integral at the trailing sections thereof.

4. The combination set forth in claim 1 in which said cross ply fiber reinforced plastic liner is characterized by fiber rovings wound in multiple layers with successive courses lying at angles generally perpendicular to each other to form a multi layer cross ply liner.

5. The combination set forth in claim 2 in which said outer cross ply fiber reinforced plastic tube is characterized by fiber glass rovings filament wound over said nose spar and said inner liner in multi layers with the fibers of one layer extending generally perpendicular to fibers of adjacent layers to form a multi layer tube of rovings integrated with said nose spar and inner liner.

6. A composite rotor blade comprising:
 (a) a rearwardly open noe spar of fiber reinforced plastic with the fibers extending spanwise the length of said spar and at the root encircling a transverse hub attachment structure,
 (b) a tubular inner liner of cross ply fiber reinforced plastic extending from a point outboard of said attachment structure to the region of the tip of said blade integrated to line and form a closure for said spar,
 (c) a blade afterbody structure having means including a skin for integrating said afterbody with said nose spar and said liner,
 (d) a trailing edge spar connected to said skin, and
 (e) a kick strut coupling the inboard end of said trailing edge spar to said hub attachment structure.

7. The combination set forth in claim 6 in which the glass fibers in said nose spar are divided to encircle said transverse hub attachment structure substantially equally above and below said kick strut.

8. The combination set forth in claim 1 in which said fibers extending spanwise of said spar occupy all of the region of said nose spar outside said inner liner except near the root of said blade in which region said fibers are formed into the bands of rectangular cross section to encircle said hub attachment structure.

9. A composite rotor blade comprising:
 (a) a rearwardly open nose spar of fiber reinforced plastic with the fibers extending spanwise the length of said spar and at the root encircling a transverse hub attachment stucture,
 (b) a tubular inner liner of cross ply fiber reinforced plastic extending from a point outboard of said attachment structure to the region of the tip of said blade integrated to line and form a closure for said spar;
 (c) a blade afterbody structure having means including a skin for integrating said afterbody with said nose spar and said liner, and
 (d) a torque box extending spanwise the length of said blade and integrated in said blade afterbody at the mid chord location therein.

10. The combination set forth in claim 9 in which said torque box comprises vertically extending cellular material having upper and lower caps of fiber reinforced plastic layers in which fibers extend spanwise the length of said torque box with a tubular outer liner of cross ply filament wound fiber reinforced by plastic extending the length of said torque box in a multi layer arrangement where one layer has fiber rovings oriented approximately 90° the orientation of fiber rovings in adjacent layers.

11. The combination set forth in claim 10 in which said torque box extends to the root of said blade.

12. The combination set forth in claim 11 in which a kick strut extends from said transverse hub attachment structure and through the root end of said torque box.

13. A nose spar for a composite rotor blade comprising:
 (a) nose structure formed of upper and lower halves of spanwise extending fibers adherently embedded in plastic and joined along a plane approximating a chord plane to form a channel open at the trailing edge,
 (b) a filament wound cross ply fiber reinforced plastic tube conforming with the inner contour of said channel and integrated therewith to line and close the trailing edge of said channel and to provide torsional strength therein, and (c) a filament wound outer cross ply fiber reinforced plastic tube encompassing said channel and said liner and integrated with said liner at said trailing edge and with the outer surfaces of said upper and lower halves to form a nose spar of high torque resistance.

14. The combination set forth in claim 13 in which a transverse hub attachment structure is provided at the root of said spar with the fibers of said upper and lower halves encircling said structure.

* * * * *